US006924035B2

(12) United States Patent
Auweter et al.

(10) Patent No.: US 6,924,035 B2
(45) Date of Patent: Aug. 2, 2005

(54) METHOD FOR PRODUCING POLYMER COATED PIGMENT PARTICLES BY PRECIPITATION

(75) Inventors: Helmut Auweter, Limburgerhof (DE); Heribert Bohn, Wattenheim (DE); Walter Mächtle, Ludwigshafen (DE); Manfred Mielke, Heidelberg (DE); Rüdiger Sens, Ludwigshafen (DE); Karl Siemensmeyer, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 57 days.

(21) Appl. No.: 10/381,056

(22) PCT Filed: Sep. 25, 2001

(86) PCT No.: PCT/EP01/11079

§ 371 (c)(1),
(2), (4) Date: Mar. 26, 2003

(87) PCT Pub. No.: WO02/26892

PCT Pub. Date: Apr. 4, 2002

(65) Prior Publication Data

US 2003/0177943 A1 Sep. 25, 2003

(30) Foreign Application Priority Data

Sep. 26, 2000 (DE) .......................................... 100 47 622

(51) Int. Cl.⁷ .............................................. C09K 19/00
(52) U.S. Cl. .................... 428/407; 427/213.3; 427/221; 427/222; 428/32.36
(58) Field of Search .............................. 427/213.3, 221, 427/222; 428/407, 32.36

(56) References Cited

U.S. PATENT DOCUMENTS

| | | | | |
|---|---|---|---|---|
| 4,665,107 A | * | 5/1987 | Micale | 523/105 |
| 4,725,522 A | | 2/1988 | Breton et al. | |
| 5,049,322 A | | 9/1991 | Devissaguet et al. | |
| 5,270,445 A | | 12/1993 | Hou | |
| 5,352,729 A | * | 10/1994 | Birkhofer et al. | 524/549 |
| 5,679,724 A | * | 10/1997 | Sacripante et al. | 523/161 |
| 5,686,012 A | * | 11/1997 | Hayashi et al. | 252/62.56 |
| 5,852,073 A | * | 12/1998 | Villiger et al. | 523/161 |
| 6,337,131 B1 | * | 1/2002 | Rupaner et al. | 428/403 |

FOREIGN PATENT DOCUMENTS

| | | |
|---|---|---|
| DE | 198 45 078 | 4/2000 |
| WO | 99/40123 | 8/1999 |
| WO | 99 51695 | 10/1999 |

* cited by examiner

Primary Examiner—H. Thi Le
(74) Attorney, Agent, or Firm—Oblon, Spivak, McClelland, Maier & Neustadt, P.C.

(57) ABSTRACT

Described is a process for preparing polymer-enrobed pigment particles, which comprises mixing in the presence of finely dispersed pigment particles a solution of a polymer in a first solvent with a second solvent in which the polymer is substantially insoluble. The pigment particle can be specifically modified by judicious selection of the polymer.

19 Claims, No Drawings

METHOD FOR PRODUCING POLYMER COATED PIGMENT PARTICLES BY PRECIPITATION

DESCRIPTION

The present invention relates to a process for producing polymer-enrobed pigment particles, to the pigment preparations thus produced and to the use thereof.

Pigments and disperse dyes are important water-insoluble colorants. For maximum color strength and brilliance, they frequently need to be in a colloidally disperse state comprising a small particle size and narrow particle size distribution. Pigments and disperse dyes have to be stabilized against agglomeration and flocculation. The colloidally disperse state is particularly important in injket printing for example, a widely used process for the contactless printing of various print media.

WO 99/51695 describes precipitated water-insoluble dyes in colloidally disperse form having an average particle size from 5 nm to 1 μm and having a variance of less than 50%. The dye particles are precipitated in the colloidally disperse form by adding water to the solution of the dye in a solvent. The water preferably contains a protective colloid, i.e., a water-soluble natural or synthetic homo- or copolymer.

DE 198 45 078 A1 concerns dye-containing polymer particles containing at least one dye in a matrix of an essentially water-insoluble polymer and having an average particle size in the range from 5 to 500 nm and a particle size distribution width (variance) of ≦35%. The dye-containing polymer particles are precipitated from a solution which contains the dye and a water-insoluble polymer in a water-miscible organic solvent.

WO 99/40123 discloses a process for preparing dye-containing aqueous polymer dispersions by free-radical aqueous emulsion polymerization of ethylenically unsaturated monomers, which comprises at least some of the monomers being employed in the form of an oil-in-water emulsion whose disperse phase contains at least one oil-soluble dye and is formed essentially by dye-containing monomer droplets having a diameter of less than 500 nm.

The aforementioned publications all describe processes using disperse dyes or oil-soluble dyes. It has been determined that the colorants produced according to the above prior art are insufficiently lightfast and migration-stable. The migration of dyes constitutes a problem especially when printing on textiles owing to the different affinities of the various dyes for various fabrics, particularly blend fabrics.

U.S. Pat. No. 4,665,107 concerns a process for modifying pigment particles by encapsulation with polymeric starting materials. A homogeneous dispersion consisting of primary pigment particles and polymer in a substantially water-immiscible organic solvent is dispersed in water to form an emulsion. The solvent is then distilled off and the emulsion droplets convert into solid particles. This process is disadvantageous in that the fine dispersion of a liquid in another is technically far from straightforward, even with the use of emulsifiers. Moreover, the dispersed droplets have a tendency to coalesce, since it is only the distillative removal of the solvent which gives rise to the encapsulated pigment particles. Furthermore, generally more than one pigment particle is present in the emulsion droplet and in the colorant particle obtained therefrom. For maximum brilliance and color strength ideally only one pigment particle should be encapsulated.

It is an object of the present invention to provide a simple process for producing lightfast, waterfast and migration-stable colorant preparations comprising colloidally disperse colorants and a preferably narrow particle size.

We have found that this object is achieved by a process in which finely divided pigments are enrobed with polymers by precipitating the polymer from a solution in the presence of finely divided pigment particles. Pigments exhibit excellent lightfastness and migration stability.

The present invention accordingly provides a process for preparing polymer-enrobed pigment particles, which comprises mixing in the presence of finely dispersed pigment particles a solution of a polymer in a first solvent with a second solvent in which the polymer is substantially insoluble and which is miscible with the first solvent.

The pigment particles may be present in fine dispersion in the solution of the polymer in the first solvent and/or in the second solvent prior to the mixing. Alternatively the pigment particles may be initially charged as a dispersion whose dispersion medium is identical to, say, the first solvent.

The process may be continuously as well as batch operated. Mixing is preferably effected under turbulent conditions. Useful apparatuses for the mixing, especially the turbulent mixing, of two liquids are known to one skilled in the art and include for example stirred tanks, Y- or T-tubes, which are optionally equipped with static mixers, or mixing nozzles.

The choice of the first solvent depends on the solubility of the polymer used. The first solvent is preferably a water-miscible organic solvent. Water-miscible solvents for the purposes of the present invention include solvents having miscibility gaps with water. In these cases, the amount ratios are chosen so that miscibility is ensured. Generally, they should be at least 10% by weight water-miscible. Examples of suitable solvents include mono- and polyalcohols such as methanol, ethanol, n-propanol, isopropanol, glycol, glycerol, propylene glycol, polyethylene glycol; also ethers such as tetrahydrofuran, dioxane, 1,2-propanediol 1-n-propyl ether, 1,2-butanediol 1-methyl ether, ethylene glycol monomethyl ether, diethylene glycol monomethyl ether; esters such as methyl acetate, monoesters of ethylene glycol or propylene glycols with acetic acid, butyrolactone; ketones such as acetone or methyl ethyl ketone; amides such as formamide, dimethylformamide, dimethylacetamide, N-methylpyrrolidone and hexamethylphosphoramide; sulfoxides and sulfones such as dimethyl sulfoxide and sulfolane; alkanecarboxylic acids such as formic acid or acetic acid.

Particularly preferred first solvents are methanol, acetone, tetrahydrofuran and dimethylformamide.

The second solvent is preferably water.

In the individual case, both the first and the second solvent are organic solvents, for example toluene or cyclohexane as the first solvent and methanol or diisopropyl ether as the second solvent.

The weight ratio of first solvent to second solvent is generally in the range from 2:1 to 1:50, especially in the range from 1:4 to 1:10. When the second solvent is water, it is generally used in excess over the first solvent. If desired, the pH of the aqueous phase may be adjusted to a desired value.

The dissolving of the polymer and also the mixing of the aqueous phase with the organic solvent phase are customarily effected in the range from room temperature to the boiling point of the solvent. The reaction is preferably carried out at atmospheric pressure, although it is also possible to employ superatmospheric pressure.

Useful pigments include not only finely divided organic but also inorganic pigments and also mixtures thereof.

Useful inorganic pigments include:

white pigments
such as titanium dioxide (C.I. Pigment White 6), zinc white, color zinc oxide; lead white; zinc sulfide, lithopone;

black pigments
such as carbon black (C.I. Pigment Black 7); iron manganese black, spinel black (C.I. Pigment Black 27), iron oxide black (C.I. Pigment Black 11);

color pigments
such as chromium oxide, chromium oxide hydrate green; chrome green (C.I. Pigment Green 48); cobalt green (C.I. Pigment Green 50); ultramarine green; cobalt blue (C.I. Pigment Blue 28 and 36); ultramarine blue; iron blue (C.I. Pigment Blue 27); manganese blue; ultramarine violet; cobalt and manganese violet; iron oxide red (C.I. Pigment Red 101); cadmium sulfoselenide (C.I. Pigment Red 108); molybdate red (C.I. Pigment Red 104); ultramarine red; iron oxide brown, mixed brown, spinel and corundum phases (C.I. Pigment Brown 24, 29 and 31), chrome orange; iron oxide yellow (C.I. Pigment Yellow 42); nickel titanium yellow (C.I. Pigment Yellow 53); C.I. Pigment Yellow 157 and 164; chromium titanium yellow; cadmium sulfide and cadmium zinc sulfide (C.I. Pigment Yellow 37 and 35); chrome yellow (C.I. Pigment Yellow 34), zinc yellow, alkaline earth metal chromates, Naples yellow; bismuth vanadate (C.I. Pigment Yellow 184);

interference pigments
metal effect pigments, pearl luster pigments;

fillers and/or delusterants
such as $SiO_2$ (Aerosil R 812), precipitated $CaCO_3$;

magnetic pigments
such as $CrO_2$, $Fe_2O_3$, $Fe_3O_4$, cobalt-modified iron oxides, barium ferrites, pure iron pigments;

useful organic pigments from the Colour Index list are:

monoazo pigments
C.I. Pigment Brown 25;
C.I. Pigment Orange 5, 13, 36 and 67;
C.I. Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 251, 112, 146, 170, 184, 210 and 245;
C.I. Pigment Yellow 1, 3, 73, 74, 65, 97, 151 and 183.

diazo pigments
C.I. Pigment Orange 16, 34 and 44;
C.I. Pigment Red 144, 166, 214 and 242;
C.I. Pigment Yellow 12, 13, 14, 16, 17, 81, 83, 106, 113, 126, 127, 155, 174, 176 and 188;

anthanthrone pigments
C.I. Pigment Red 168 (C.I. Vat Orange 3);

anthraquinone pigments
C.I. Pigment Yellow 147 and 177;
C.I. Pigment Violet 31;

anthrapyrimidine pigments
C.I. Pigment Yellow 108 (C.I. Vat Yellow 20);

quinacridone pigments
C.I. Pigment Red 122, 202 and 206; C.I. Pigment Violet 19;

quinophthalone pigments
C.I. Pigment Yellow 138;

dioxazine pigments
C.I. Pigment Violet 23 and 37;

flavanthrone pigments
C.I. Pigment Yellow 24 (C.I. Vat Yellow 1);

indanthrone pigments
C.I. Pigment Blue 60 (C.I. Vat Blue 4) and 64 (C.I. Vat Blue 6);

isoindoline pigments
C.I. Pigment Orange 69; C.I. Pigment Red 260; C.I. Pigment Yellow 139 and 185;

isoindolinone pigments
C.I. Pigment Orange 61; C.I. Pigment Red 257 and 260; C.I. Pigment Yellow 109, 110, 173 and 185;

isoviolanthrone pigments
C.I. Pigment Violet 31 (C.I. Vat Violet 1);

metal complex pigments
C.I. Pigment Yellow 117 and 153; C.I. Pigment Green 8;

perinone pigments
C.I. Pigment Orange 43 (C.I. Vat Orange 7); C.I. Pigment Red 194 (C.I. Vat Red 15);

perylene pigments
C.I. Pigment Black 31 and 32; C.I. Pigment Red 123, 149, 178, 179 (C.I. Vat Red 23), 190 (C.I. Vat Red 29) and 224; C.I. Pigment Violet 29;

phthalocyanine pigments
C.I. Pigment Blue 15, 15:1, 15:2, 15:3, 15:4, 15:6 and 16;
C.I. Pigment Green 7 and 36;

pyranthrone pigments
C.I. Pigment Orange 51, C.I. Pigment Red 216 (C.I. Vat Orange 4);

thioindigo pigments
C.I. Pigment Red 88 and 181 (C.I. Vat Red 1); C.I. Pigment Violet 38 (C.I. Vat Violet 3);

triarylcarbonium pigments
C.I. Pigment Blue 1, 61 and 62; C.I. Pigment Green 1; C.I. Pigment Red 81, 81:1 and 169; C.I. Pigment Violet 1, 2, 3 and 27;

C.I. Pigment Black 1 (aniline black);
C.I. Pigment Yellow 101 (aldazine yellow);
C.I. Pigment Brown 22;

vat dyes (other than those already mentioned above):
C.I. Vat Yellow 2, 3, 4, 5, 9, 10, 12, 22, 26, 33, 37, 46, 48, 49 and 50;
C.I. Vat Orange 1, 2, 5, 9, 11, 13, 15, 19, 26, 29, 30 and 31;
C.I. Vat Red 2, 10, 12, 13, 14, 16, 19, 21, 31, 32, 37, 41, 51, 52 and 61;
C.I. Vat Violet 2, 9, 13, 14, 15, 17 and 21;
C.I. Vat Blue 1 (C.I. Pigment Blue 66), 3, 5, 10, 12, 13, 14, 16, 17, 18, 19, 20, 22, 25, 26, 29, 30, 31, 35, 41, 42, 43, 64, 65, 66, 72 and 74;
C.I. Vat Green 1, 2, 3, 5, 7, 8, 9, 13, 14, 17, 26, 29, 30, 31, 32, 33, 40, 42, 43, 44 and 49;
C.I. Vat Brown 1, 3, 4, 5, 6, 9, 11, 17, 25, 32, 33, 35, 38, 39, 41, 42, 44, 45, 49, 50, 55, 57, 68, 72, 73, 80, 81, 82, 83 and 84;
C.I. Vat Black 1, 2, 7, 8, 9, 13, 14, 16, 19, 20, 22, 25, 27, 28, 29, 30, 31, 32, 34, 36, 56, 57, 58, 63, 64 and 65.

Preferred pigments are $SiO_2$ (Aerosil), Pigment Blue 15:4, Pigment Blue 15:3, Pigment Red 122 and Pigment Yellow 138.

The pigment should be very finely divided. The pigment particles preferably have a particle size $\leq 1$ μm, especially in the range from 0.01 μm to 0.5 μm.

The weight ratio of pigment particles to total amount of the first and second solvents is customarily in the range from 1:20 to 1:10,000, preferably about 1:1000 to 1:5000.

The process of the invention is notable for the multiplicity of polymers which can be used. Mixtures of polymers can also be used. The thermal properties, such as the glass transition temperature or the melting point, and the mechanical and optical properties, such as the refractive index, of the particles can be optimized to the end use. Judicious choice of the polymer makes it possible to modify, especially hydrophilicize or hydrophobicize, the surfaces of the pigment particles.

Each or every polymer has to be soluble in the first solvent and substantially insoluble in the second solvent. Generally, the solubility of the polymer in the second solvent is less than 1 g/l in order that the losses of polymer may be minimized. The solubility of the polymer in the first solvent is customarily at least 10 g/l in order that the volumes of liquid may be kept small. The concentration of the polymer dissolved in the first solvent is customarily about 10 g/l to 40 g/l, especially from 10 g/l to 25 g/l. The term "polymer" as used herein also comprehends a mixture of various polymers.

The polymer is directly precipitated when its solubility is exceeded in the course of the turbulent mixing of the two solvents. It is predominantly or completely precipitated onto the pigment particles and effectively encapsulates them.

Useful polymers include first of all polyesters. They are preparable in a simple manner by condensation polymerization of aliphatic, cycloaliphatic and aromatic di-, tri- and/or polycarboxylic acids or their functional derivatives such as anhydrides or chlorides with di-, tri- and/or polyols. Useful carboxylic acids include for example dicarboxylic acids of 2 to 20 carbon atoms, preferably 4 to 15 carbon atoms, for example malonic acid, succinic acid, glutaric acid, adipic acid, pimelic acid, suberic acid, sebacic acid, dodecanedioic acid, phthalic acid, terephthalic acid, isophthalic acid, cyclohexanedicarboxylic acid, etc. Useful carboxylic acids further include sulfosuccinic acid and sulfoisophthalic acid. Dicarboxylic acids may be used individually or as mixtures. Useful diols include for example glycols, preferably glycols of 2 to 25 carbon atoms. Useful glycols include for example 1,2-ethanediol, 1,3-propanediol, 1,4-butanediol, 1,5-pentanediol, 1,6-hexanediol, 1,10-decanediol, diethylene glycol, 2,2,4-trimethyl-1,5-pentanediol, 2,2-dimethyl-1,3-propanediol, 1,4-dimethylolcyclohexane, 1,6-dimethylolcyclohexane and ethoxylated/propoxylated products of 2,2-bis(4-hydroxyphenyl)-propane (bisphenol A), etc. Branched and crosslinked polyesters are formed in the polycondensation of trihydric or higher alcohols with polyfunctional carboxylic acids. Useful triols and polyols have for example 3 to 25, preferably 3 to 18 carbon atoms. These include for example glycerol, trimethylolpropane, erythritol, pentaerythritol, sorbitol and alkoxylates thereof, etc.

The polycondensation of hydroxycarboxylic acids or lactones leads to polyesters of the hydroxycarboxylic acid type. These consist of just one monomer, the hydroxycarboxylic acid. Useful hydroxycarboxylic acids include α-hydroxycarboxylic acids such as glycolic acid, lactic acid, hydroxybutyric acid, mandeleic acid, which may each also be present in the form of its lactides, or β-hydroxycarboxylic acids, γ-hydroxycarboxylic acids, δ-hydroxycarboxylic acids and ω-hydroxycarboxylic acids respectively. Useful lactones for preparing polyesterols include for example lactones of 3 to 20 carbon atoms, such as α,α-dimethyl-β-propiolactone, γ-butyrolactone, ε-caprolactone, etc.

Useful polyesters further include polycarbonates, i.e., polyesters of carbonic acid with hydroxy compounds. Their properties can be varied within wide limits in the synthesis by judicious choice of the dihydroxy compound, which can be aliphatic or aromatic or a mixture thereof. A particularly suitable polycarbonate is Lexan 141, which is marketed by GE Plastics.

Useful polymers further include polyvinyl acetals, such as polyvinyl formals or polyvinyl butyrals, which are available by reaction of polyvinyl alcohol with aldehydes such as formaldehyde or butyraldehyde, and also polyacetals, such as polyoxymethylene in particular.

Useful polymers for the process of the invention further include polyurethanes and polyureas. They are formed for example in the polyaddition of diols or diamines with diisocyanates. Useful diisocyanates include for example diisocyanates such as hexamethylene diisocyanate, isophorone diisocyanate, phenylene 1,4-diisocyanate, naphthylene 1,5-diisocyanate or toluylene 2,4- or 2,6-diisocyanate. The diol may be of low molecular weight, for example ethylene glycol, propylene glycol, 1,4-butylene glycol, etc., or polymeric such as, for example, a polyester- or polyetherdiol.

Useful polymers further include homo- or copolymers of ethylenically unsaturated monomers. The copolymers may be random copolymers, block copolymers, graft copolymers and the like. Useful polymers consist of 10–100% by weight, preferably 20–90% by weight, of one or more water-insoluble ethylenically unsaturated monomers, 0–90% by weight, preferably 5–80% by weight, of one or more water-soluble ethylenically unsaturated monomers and 0–30% by weight, preferably 2–20% by weight, of one or more crosslinking monomers.

Useful water-insoluble ethylenically unsaturated monomers include:

i) esters of α,β-ethylenically unsaturated $C_3$–$C_8$-monocarboxylic acids and $C_4$–$C_8$-dicarboxylic acids with $C_1$–$C_{12}$-alkanols, especially $C_1$–$C_8$-alkanols. Examples of these mono- and dicarboxylic acids include acrylic acid, methacrylic acid, crotonic acid, maleic acid, fumaric acid, itaconic acid and citraconic acid, of which acrylic acid and methacrylic acid are preferred. Examples of $C_1$–$C_{12}$-alkanols include methanol, ethanol, n-propanol, i-propanol, n-butanol, i-butanol, sec-butanol, t-butanol, 2-ethylhexanol, n-octanol and n-dodecanol. Preferred esters include methyl methacrylate, n-butyl acrylate and 2-ethylhexyl acrylate;

ii) vinyl esters of $C_1$–$C_{12}$-monocarboxylic acids, especially $C_1$–$C_8$-monocarboxylic acids. Examples of vinyl esters include vinyl acetate, vinyl propionate, vinyl butyrate, vinyl hexanoate and vinyl decanoate;

iii) styrenics, such as styrene and α-methylstyrene;

iv) $C_2$–$C_6$-olefins, such as ethylene, propene, 1-butene, 2-butene and isobutene or diolefins having conjugated double bonds, such as butadiene or isoprene.

v) acrylonitrile, methacrylonitrile; vinyl ethers of $C_1$–$C_8$-alkanols, especially vinyl ethyl ether.

Useful water-soluble ethylenically unsaturated monomers include monomers having polar groups, i.e., anionic monomers, cationic monomers and nonionic monomers. They generally have a water solubility of at least 5 g/l at 25° C. A monomer is termed water soluble even when its ionized, i.e., protonated or deprotonated, form meets the specified solubility criterion.

Anionic monomers are preferably selected from:

i) α,β-ethylenically unsaturated $C_3$–$C_8$-monocarboxylic acids and $C_4$–$C_8$-dicarboxylic acids and the monoesters with $C_1$–$C_{12}$-alkanols and the anhydrides thereof. Examples of these carboxylic acids are indicated above as acid component of the esters. Acrylic acid and methacrylic acid are preferred;

ii) aromatic vinylcarboxylic acids, such as 2-, 3- or 4-vinylbenzoic acid;

iii) monoethylenically unsaturated sulfonic and phosphonic acids, such as vinylsulfonic acid, allylsulfonic acid, vinylbenzenesulfonic acid, vinylphosphonic acid.

Particularly preferred anionic monomers include acrylic acid, methacrylic acid and vinylsulfonic acid.

Useful cationic monomers include ethylenically unsaturated basic-nitrogen compounds. Preference is given to esters of the above-described α,β-ethylenically unsaturated $C_3$–$C_8$-monocarboxylic acids with amino-$C_2$–$C_8$-alkanols, mono-$C_1$–$C_4$-alkylamino-$C_2$–$C_8$-alkanols or di-$C_1$–$C_4$-alkylamino-$C_2$–$C_8$-alkanols, N-vinylimidazoles and 2-, 3- or 4-vinylpyridines and the quaternary forms thereof obtained by alkylation with alkyl halides, dialkyl sulfates and alkylene oxides.

Preferred nonionic water-soluble monomers include N-vinyllactams, especially N-vinylpyrrolidone, esters of α,β-ethylenically unsaturated $C_3$–$C_8$-monocarboxylic acids with $C_2$–$C_4$-alkanediols and the ethoxylated or propoxylated derivatives thereof, amides, mono-$C_1$–$C_4$-alkylamides and di-$C_1$–$C_4$-alkylamides of the above-recited α,β-ethylenically unsaturated $C_3$–$C_8$-monocarboxylic acids, preferably acrylamide and methacrylamide.

Crosslinking monomers are polyfunctional monomers having two or more nonconjugated ethylenically unsaturated bonds or containing an alkoxy, hydroxyl or N-alkylol group as well as an ethylenically unsaturated bond. Examples thereof include the diesters of dihydric alcohols with the abovementioned ethylenically unsaturated monocarboxylic acids, the vinyl and allyl esters of ethylenically unsaturated carboxylic acids or aromatic divinyl compounds, especially ethylene glycol diacrylate, 1,4-butylene glycol diacrylate, propylene glycol diacrylate, vinyl methacrylate, allyl acrylate and divinylbenzene. Examples of polyfunctional monomers include the N-hydroxyalkylamides and N-alkylolamides of the ethylenically unsaturated carboxylic acids mentioned and also glycidyl acrylate and glycidyl methacrylate.

Useful examples of homo- or copolymers of ethylenically unsaturated monomers include polystyrene and copolymers of styrene such as ASA, SAN, ABS; a terpolymer of styrene, acrylic acid and 4-vinylpyridine; polyvinyl acetate and also polymethyl methacrylate.

The amount ratio of pigment to polymer is generally in the range from 1:0.1 to 1:10 parts by weight, preferably in the range from 1:0.5 to 1:7 parts by weight.

The first and/or second solvents preferably contain an emulsifier and/or a protective colloid. They may further contain customary assistants such as humectants and preservatives. Alternatively the dispersion of the polymer-enrobed pigment particles may also be admixed therewith in one or more downstream process steps. The downstream process step may be continuously as well as batch operated.

The second solvent, especially when it is water, preferably contains at least one protective colloid. The presence of the protective colloid ensures long-term stabilization by preventing the agglomeration of the colloidally disperse particles. Advantageously the first and/or second solvent(s) additionally contain(s) at least one emulsifier.

Useful protective colloids include the natural or semisynthetic polymers customarily used for this purpose. Useful natural or semisynthetic protective colloids include for example gelatin, including fish gelatin, starch or starch derivatives, such as dextrins, pectin, gum arabic, caseine, caseinate, alginates, cellulose and cellulose derivatives such as methylcellulose, carboxymethylcellulose, hydroxypropylcellulose or hydroxypropylmethylcellulose. Sodium caseinate is used in particular.

Useful synthetic protective colloids include water-soluble homo- or copolymers, which may be neutral polymers, cationic polymers or anionic polymers. Complexes of polycationic and polyanionic polymers and also coacervates may also be used.

The protective colloid polymers are polymerized from monomers having hydrophilic groups and optionally comonomers having hydrophobic groups, the ratio between hydrophilic and hydrophobic groups being chosen so that the copolymer is water soluble.

Useful hydrophilic monomers include for example N-vinyllactams, such as N-vinylpyrrolidone; acrylamide or methacrylamide and their N-$C_1$–$C_4$-mono- or N,N-di-$C_1$–$C_4$-alkyl derivatives; acrylic acid or methacrylic acid; monomers having a primary, secondary or tertiary basic nitrogen atom such as amino-$C_2$–$C_4$-alkyl acrylates and methacrylates, for example dimethylaminoethyl (meth) acrylate, and the derivatives thereof quaternized with $C_1$–$C_4$-alkylating agents; ethylenically unsaturated sulfonic acids such as vinylsulfonic acid, acrylamido-N-propanesulfonic acid and styrenesulfonic acid; hydroxy-$C_2$–$C_4$-alkyl acrylates and methacrylates; allyl alcohol and methallyl alcohol; olefinically unsaturated compounds having epoxy groups such as glycidyl acrylate and glycidyl methacrylate; monoesters and diesters of ethylenically unsaturated $C_4$–$C_8$-dicarboxylic acids such as maleic acid and itaconic acid with aminoalcohols such as dimethylaminoethanol; and amides or imides of these carboxylic acids with diamines such as dimethylaminopropylamine.

Useful comonomers having hydrophobic groups include for example $C_2$–$C_4$-alkyl vinyl ethers such as ethyl vinyl ether; vinyl esters of $C_2$–$C_8$-carboxylic acids such as vinyl acetate and vinyl propionate; $C_1$–$C_8$-alkyl acrylates and methacrylates such as methyl, ethyl, n-butyl and 2-ethylhexyl acrylate and methacrylate; styrenics such as styrene; and α-olefins having up to 20 carbon atoms such as ethylene, propylene and isobutylene.

The amount of protective colloid in the second solvent is generally in the range from 1 to 50% by weight, preferably in the range from 3 to 30% by weight, based on the total weight of the respective phase.

Emulsifiers are stabilizing assistants. They are also known as surfactants. Useful emulsifiers include the customary emulsifiers useful for preparing emulsions. The emulsifiers may be anionic, cationic or nonionic in nature. Anionic emulsifiers include for example soaps, alkanesulfonates, olefinsulfonates, alkylarylsulfonates, alkylnaphthalenesulfonates, sulfosuccinates, alkyl sulfates and alkyl ether sulfates, alkyl methyl ester sulfates, acyl glutamates, sarcosinates and taurates. Examples include sodium laurylsulfate, sodium lauryl ether sulfate, oleylsulfonate, nonylbenzenesulfonate, sodium dodecylbenzenesulfonate and butylnaphthalenesulfonate.

Cationic emulsifiers include for example alkyltrimethylammonium halides/alkylsulfates, alkylpyridinium halides and dialkyldimethylammonium halides/alkylsulfates.

Useful nonionic emulsifiers include for example alkoxylated animal/vegetable fats and oils, for example corn oil ethoxylates, castor oil ethoxylates, tallow fat ethoxylates; glyceryl esters, for example glyceryl monostearate; fatty alcohol alkoxylates and oxo alcohol alkoxylates; alkylphenol alkoxylates, for example isononylphenol ethoxylates; and sugar surfactants, for example sorbitan fatty acid esters (sorbitan monooleate, sorbitan tristearate), polyoxyethylene sorbitan fatty acid ester.

It is also possible to use zwitterionic emulsifiers, such as sulfobetaines, carboxybetaines, alkyldimethylamine oxides, for example tetradecyldimethylamine oxide, and polymer surfactants, such as di-, tri- and multi-block polymers of the type (AB)x, ABA and BAB, for example polyethylene oxide-block-polypropylene oxide, polystyrene-block-polyethylene oxide and AB comb polymers, for example polymethacrylate-comb-polyethylene oxide.

Another useful emulsifier is the ethoxylated and sulfonated bisphenol A adduct with styrene.

Useful emulsifiers further include fluorosurfactants. Their hydrophobic group is a fluoro- or perfluoroalkyl radical, especially a $C_8$–$C_{22}$-perfluoroalkyl radical. They further contain a hydrophilic group, usually a carboxylate, sulfonate or sulfate group. They are effective in extremely low concentrations, which are substantially lower than in the case of conventional surfactants. They are also notable for high chemical and thermal stability. Preference is given to using the Bayowet FT 448 fluorosurfactant marketed by Bayer.

The amount of emulsifier in the first and/or second solvents is generally in the range from 10 to 500% by weight, preferably in the range from 50 to 200% by weight, based on the total weight of the pigment used.

The aqueous phase preferably contains a humectant such as 1,2-propanediol or glycerol.

The aqueous phase preferably contains a preservative such as for example a 1,2-benzisothiazoline compound.

The pigment dispersion obtained by the process of the invention is used either directly or after admixture with assistants and additives customary in these cases, provided these had not already been dissolved in the first and/or second solvents prior to precipitation. Customary assistants and additives include for example viscosity modifiers such as water-soluble starch and cellulose derivatives as thickeners.

Alternatively the colorant preparation may be concentrated in a conventional manner, for example by evaporating off the first solvent with or without a portion of the second solvent. Volatiles may also be removed completely, for example by spray drying. The dyes of the invention are obtained in the form of a dry powder which is redispersible, for example in water. Further protective colloids may be added before or during the concentrating in order that even better colloidal stabilization may be obtained.

The polymer-enrobed pigment particles generally have an average particle size in the range from 10 nm to 5 $\mu$m and a particle size distribution width (variance) of $\leq$60%. The particle size is suitably measured by quasi-elastic light scattering and evaluated by the cumulant method (see Bruce, J. Berne and Robert Pecora, "Dynamic Light Scattering", John Wiley & Sons Inc. 1976, p. 196). The average particle size is preferably in the range from 5 nm to 1 $\mu$m and the width of the particle size distribution is preferably $\leq$50%.

The process of production is such that the polymer-enrobed pigment particle will generally contain only one pigment particle as core. The pigment serves as a seed onto which the polymer is precipitated.

The invention also provides a pigment preparation, for example in the form of an inkjet ink preparation, containing the pigment particles encapsulated according to the invention, usually in an aqueous phase.

The pigment preparations of the invention are very useful for printing print media, especially for printing paper, foil, film, papers for the reproduction of digital photographic images and graphics and also for printing textiles. The preferred process for printing textiles is transfer printing.

Pigment preparations of the invention can be waterfast if a water-insoluble polymer is used for enrobing the pigment particles. Thus, aqueous pigment dispersions can be finished with water-insoluble polymers which are lightfast and migration stable.

In the inkjet printing process, the aqueous colorant preparation is sprayed in small droplets directly onto the substrate. There is a continuous form of the inkjet process, in which the colorant preparation is uniformly pressed through a nozzle and the jet is directed onto the substrate by an electric field depending on the pattern to be printed, and there is an interrupted or drop-on-demand process, in which the ink is expelled only where a colored dot is to appear, the latter form of the process employing either a piezoelectric crystal or a heated cannula (bubble or thermal jet process) to exert pressure on the ink system and so eject an ink droplet. These techniques are described in Text. Chem. Color, Vol. 19(8), p. 23–29, 1987, and Vol. 21(6), p. 27–32, 1989.

The colorant preparations used according to the invention may be printed on all types of substrate material. Useful substrate materials include for example coated or uncoated cellulosics such as paper, paperboard, cardboard, wood and woodbase, coated or uncoated metallic materials such as foils, sheets or workpieces composed of aluminum, iron, copper, silver, gold, zinc or alloys thereof, coated or uncoated silicatic materials such as glass, porcelain and ceramics, polymeric materials of any kind such as polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers such as gelatin, textile materials such as fibers, yarns, threads, knits, wovens, nonwovens and garments composed of polyester, modified polyester, polyester blend fabrics, cellulosics such as cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabrics, leather—both natural and artificial—in the form of smooth leather, nappa leather or suede leather.

Alternatively, the images and patterns created by inkjet printing may first be applied to an intermediate substrate, for example a transfer paper, and applied to a second substrate, for example a textile substrate, by contacting the latter. This process frequently takes place at elevated temperature, for example at from 180 to 200° C., in a press.

The print created on the substrate may be fixed using a heat treatment for example. This succeeds particularly when the pigment particles have been enrobed with thermoplastic polymers having a glass transition temperature of –100 to +250° C., especially from 0 to 220° C., more particularly from 20 to 200° C. Fixation thus requires only relatively low temperatures, as generated for example by ironing or by means of some other heat source, for the polymer matrix to flow and to form a dye film on the substrate, for example a textile.

Alternatively or additionally the print can be fixed by subsequently applying a binder, if desired in the form of an aqueous dispersion or emulsion, and cured. Radiation-curable, thermally curable or air drying binders or physically drying binder dispersions or emulsions may be used. Examples of radiation-curable binders are monomers, prepolymers, polymers and blends thereof that contain acrylate groups, vinyl groups and/or epoxy groups.

Thermally curable binders are generally crosslinked via polycondensation or polyaddition reactions. Particularly useful thermally curable binders include for example polycondensation-crosslinking binders based on acrylates containing methylol groups.

Examples of air drying binders, where aliphatic double bonds are oxidatively crosslinked by the action of oxygen from air, are drying oils such as linseed oil, wood oil and safflower oil.

Further examples of applications for the pigment preparations of the invention include the coloring of polymer compositions such as polyethylene (HDPE, LPPE), polyurethane and styrene acrylonitrile.

Because the pigment particles have been modified by enrobement with a polymer, the pigments are easy to incorporate in and compatibilize with the polymer compositions to be colored.

The examples which follow illustrate the invention. They exemplify the precipitation of a polymer dissolved in a water-miscible organic solvent by mixing with an aqueous phase.

In Examples 1–4 the pigment is present as a dispersion in the aqueous phase. In Example 5 an aqueous pigment dispersion is stirred into the polymer solution immediately prior to the mixing with the rest of the aqueous phase.

In Examples 6 and 7 the polymer solution contains the dispersed pigment. In Example 8 the pigment is present as a dispersion in the aqueous solution. In contrast to Examples 1–7, where mixing is effected continuously, Example 8 illustrates a batch operation of the process according to the invention.

EXAMPLE 1

An aqueous phase was prepared by dissolving 6.60 g of an aqueous pigment dispersion containing 0.66 g of Pigment Blue 15:4 (BASF), 0.66 g of T38909 dispersant (ethoxylated and sulfonated bisphenol A adduct of styrene, BASF), 0.22 g of humectant (1,2-propanediol, Merck) and 0.033 g of Proxcel preservative (1,2-benzisothiazoline compound, BASF) with 2000 g of distilled water containing 0.66 g of a fluorosurfactant (Bayowet FT 448, Bayer) in solution. A solvent phase was prepared by dissolving 2 g of a polycarbonate (Lexan 141, GE Plastics) and 1 g of Primacor 59801 (copolymer of polyethylene and acrylic acid, DOW) in 200 g of THF.

The aqueous phase was continuously mixed at a flow rate of 507 g/min with the solvent phase, flow rate 63.5 g/min. A rotary evaporator was then used at 45° C. and 90 mbar to remove the THF solvent and some of the water until a solids concentration of 3.1% by weight had been reached.

The aqueous pigment dispersion thus obtained was analyzed using an analytical ultracentrifuge. An $H_2O/D_2O$ sedimentation analysis revealed a uniform particle density of o=1.28±0.05 g/cm$^3$. It is accordingly clear that unitary core-sheath particles are present, i.e., that the pigment particles have been coated with polymer. The particle size was determined by dynamic light scattering. It revealed a mean of 115 nm and a variance of 23%.

EXAMPLE 2

Example 1 was repeated except that Pigment Blue 15:4 was replaced by the same amount of Pigment Red 122.

The flow rate was 505 g/min for the aqueous phase and 67 g/min for the solvent phase. The sample was concentrated to a solids concentration of 2.9%. The particle size was 136 nm coupled with a variance of 25%.

EXAMPLE 3

Example 1 was repeated except that Pigment Blue 15:4 was replaced by the same amount of Pigment Yellow 138.

The flow rate was 491 g/min for the aqueous phase and 70 g/min for the solvent phase. The sample was concentrated to a solids concentration of 2.5%. The particle size was 194 nm coupled with a variance of 27%.

EXAMPLE 4

An aqueous phase was prepared by dissolving 36.6 g of an aqueous pigment dispersion containing 3.66 g of Pigment Blue 15:4 (BASF), 3.66 g of T38909 dispersant (ethoxylated and sulfonated bisphenol A adduct of styrene, BASF), 1.21 g of humectant (1,2-propanediol, Merck) and 0.18 g of Proxcel preservative (1,2-benzisothiazoline compound, BASF) with 11 000 g of distilled water. A solvent phase was prepared by dissolving 23 g of terpolymer (random copolymer of 20% styrene, 20% acrylic acid and 60% 4-vinylpyridine) in 1533 g of acidic methanol consisting of 98% by weight of methanol and 2% by weight of 1 M HCl.

The aqueous phase was then continuously mixed at a flow rate of 510 g/min with the solvent phase, flow rate 69 g/min. A rotary evaporator was then used at 45° C. and 90 mbar to remove methanol and some of the water until a solids concentration of 4.0% by weight had been reached. The average particle size was 138 nm and the variance 20%.

EXAMPLE 5

An aqueous phase was prepared by dissolving 0.66 g of a fluorosurfactant (Bayowet FT 448, Bayer) in 2000 g of distilled water which had been rendered slightly alkaline with 4 ml of 1 M NaOH. The solvent phase consisted of a solution of 2 g of a polycarbonate (Lexan 141, GE Plastics) and 1 g of Primacor 59801 (copolymer of polyethylene and acrylic acid, DOW) in 200 g of THF. Immediately prior to the continuous mixing of aqueous phase and solvent phase, 5 g of an aqueous pigment dispersion containing 0.5 g of Pigment Blue 15:4 (BASF) and 0.5 g of T38909 dispersant (ethoxylated and sulfonated bisphenol A adduct of styrene, BASF) were stirred into the solvent phase.

The aqueous phase was then continuously mixed at a flow rate of 500 g/min with the solvent phase, flow rate 72 g/min. A rotary evaporator was then used at 45° C. and 90 mbar to remove the THF solvent and some of the water until a solids concentration of 4.0% by weight had been reached. The average particle size was 252 nm and the variance 20%.

EXAMPLE 6

An aqueous phase was prepared by dissolving 6 g of a protective colloid (sodium caseinate, Lacto Bretagne Associés) and 5 g of a fluorosurfactant (Bayowet FT 448, Bayer) in 14 000 g of distilled water. The pH was adjusted to 11.8 with 28 ml of 1 M NaOH. A solvent phase was prepared by dispersing 4 g of Pigment Blue 15:3 (BASF) in 1600 g of THF using 16 g of a polycarbonate (Lexan 141, GE Plastics) and 8 g of Primacor 59801 (copolymer of polyethylene and acrylic acid, DOW).

The aqueous phase was then continuously mixed at a flow rate of 507 g/min with the solvent phase, flow rate 64 g/min. A rotary evaporator was then used at 45° C. and 90 mbar to remove the THF solvent and some of the water until a solids concentration of 7.8% by weight had been reached. The average particle size was 262 nm and the variance 16%.

EXAMPLE 7

An aqueous phase was prepared by dissolving 0.66 g of a fluorosurfactant (Bayowet FT 448, Bayer) in 2000 g of distilled water which had been rendered slightly alkaline with 4 ml of 1 M NaOH. A solvent phase was prepared by dispersing 0.5 g of an $SiO_2$ pigment (Aerosil R 812, Degussa) in 200 g of THF using 2 g of a polycarbonate (Lexan 141, GE Plastics) and 1 g of Primacor 59801 (copolymer of polyethylene and acrylic acid, DOW).

The aqueous phase was then continuously mixed at a flow rate of 495 g/min with the solvent phase, flow rate 71 g/min. A rotary vaporator was then used at 45° C. and 90 mbar to remove the THF solvent and some of the water until a solids concentration of 2.5% by weight had been reached. The average particle size was 122 nm and the variance 24%.

EXAMPLE 8

An aqueous phase was prepared by dissolving 6.60 g of an aqueous pigment dispersion containing 0.66 g of Pigment Blue 15:4 (BASF), 0.66 g of T38909 dispersant (ethoxylated and sulfonated bisphenol A adduct of styrene, BASF), 0.22 g of humectant (1,2-propanediol, Merck) and 0.033 g of Proxcel preservative (1,2-benzisothiazoline compound, BASF) with 1500 g of distilled water containing 0.66 g of a fluorosurfactant (Bayowet FT 448, Bayer) in solution. A solvent phase was prepared by dissolving 2 g of a polycarbonate (Lexan 141, GE Plastics) and 1 g of Primacor 59801 (copolymer of polyethylene and acrylic acid, DOW) in 397 g of THF.

The solvent phase was added dropwise, using a dropping funnel, over 100 minutes with stirring.

The aqueous starting dispersion had an average particle size of 131 nm coupled with a variance of 48%, whereas, after polymer coating of the pigment particles had been carried out, the particle size rose to 157 nm coupled with a variance of 42%.

We claim:

1. A process for preparing polymer-enrobed pigment particles, which comprises dissolving a polymer in a first solvent mixing the solution of said polymer in said first solvent with a second solvent which contains finely dispersed pigment particles and in which said polymer is substantially insoluble, said second solvent being miscible with the first solvent, whereby said polymer is precipitated from the mixture of solvents onto said finely dispensed pigment particles wherein the first solvent is selected from organic water-miscible solvents.

2. A process as claimed in claim 1, wherein the second solvent is water.

3. A process as claimed in claim 1, wherein the polymer comprises a polyester, a polyvinyl acetal, polyacetal, polyurethane and/or a polyurea.

4. A process as claimed in claim 3, wherein said polymer comprises a polycarbonate.

5. A process as claimed in claim 1, wherein the polymer comprises a polymer polymerized from 10–100% by weight of one or more water-insoluble ethylenically unsaturated monomers, 0–90% by weight of one or more water-soluble lethylenically unsaturated monomers and 0–30% by weight of one or more crosslinking monomers.

6. A process as claimed in claim 1, wherein the first solvent and/or the second solvent contain(s) an emulsifier and/or a protective colloid in solution.

7. A process as claimed in claim 1, wherein the polymer has a glass transition temperature of from −100 to +250° C.

8. Pigmentary composition, suitable for use in an ink jet printing formulation, comprising composite particles of pigment from 10 nm to 500 nm in size and a polymer robe surrounding the pigment particle, said polymer enrobed pigment particles being made by the process of claim 1.

9. A pigmentary composition of claim 8, wherein said polymer comprises a polyester, a polyvinyl acetal, polyacetal, polyurethane and/or a polyurea.

10. A pigmentary composition of claim 8, wherein said polymer is comprised of from 10–100% by weight of one or more water-insoluble ethylenically unsaturated monomers, 0–90% by weight of one or more water-soluble ethylenically unsaturated monomers and 0–30% by weight of one or more crosslinking monomers.

11. A pigmentary composition of claim 8, wherein said polymer comprises a polycarbonate.

12. A pigmentary composition of claim 8, wherein said polymer comprises a mixture of polycarbonate and a copolymer of polyethylene and acrylic acid.

13. A pigmentary composition as set forth in claim 8 wherein said polymer comprises a terpolymer of styrene, acrylic acid and 4-vinylpyridine.

14. A method of printing sheetlike substrates comprising ink jet printing said substrates with an ink jet ink comprising the pigmentary composition of claim 13.

15. A method of printing sheetlike substrates comprising ink jet printing said substrate with an ink jet ink comprising the pigmentary composition of claim 8.

16. A process as claimed in claim 1 wherein the solubility of said polymer in the second solvent is less than 1 g/l.

17. A process as claimed in claim 1, wherein said polymer comprises a mixture of polycarbonate and a copolymer of polyethylene and acrylic acid.

18. A process as claimed in claim 1, wherein said second solvent is water and said second solvent contains a protective colloid.

19. A process as claimed in claim 1, where the polymer enrobed particles produced have an average particle size in the range of from 10 nm to 5 µm and a particle size distribution width (variance) of ≦60%.

* * * * *